United States Patent [19]

Lundberg et al.

[11] 4,387,174

[45] Jun. 7, 1983

[54] ADHESIVE COMPOSITIONS

[75] Inventors: Robert D. Lundberg, Bridgewater; Pawan K. Agarwal, Westfield; Robert A. Weiss, Summit, all of N.J.

[73] Assignee: Exxon Research and Engineering Co., Florham Park, N.J.

[21] Appl. No.: 305,921

[22] Filed: Sep. 28, 1981

Related U.S. Application Data

[63] Continuation-in-part of Ser. No. 196,213, Oct. 14, 1980, abandoned.

[51] Int. Cl.$^3$ .......................... C08K 5/01; C08K 3/04; C08K 3/36
[52] U.S. Cl. ...................................... 524/66; 524/210; 524/211; 524/216; 524/230; 524/235; 524/321; 524/322; 524/394; 524/399; 524/425; 524/445; 524/451; 524/474; 524/487; 524/499; 524/521; 524/519; 524/547; 525/192; 525/196; 525/212; 526/240; 526/287
[58] Field of Search .................. 525/192, 196, 212; 526/240, 287; 524/322, 321, 230, 394, 399, 210, 211, 232, 235, 216, 425, 445, 474, 451, 487, 547, 521, 499, 519, 66

[56] References Cited

U.S. PATENT DOCUMENTS

| | | | |
|---|---|---|---|
| 3,067,161 | 12/1962 | Roth ..................... | 524/547 |
| 3,206,445 | 9/1965 | Volk ..................... | 526/240 |
| 3,331,798 | 7/1967 | Hibbard ................. | 525/192 |
| 3,340,238 | 9/1967 | Smith et al. ........... | 526/240 |
| 3,646,169 | 2/1972 | Wirth .................... | 525/192 |
| 3,734,819 | 5/1973 | Knutson ................ | 526/202 |
| 3,801,531 | 4/1974 | Berejka et al. ........ | 524/270 |
| 3,867,247 | 2/1975 | O'Farrell et al. ...... | 524/390 |
| 3,996,181 | 12/1976 | Hayashi et al. ........ | 524/522 |
| 4,096,103 | 6/1978 | Lakshmanan et al. .. | 524/499 |
| 4,115,331 | 9/1978 | Tominaga et al. ..... | 524/499 |
| 4,152,309 | 5/1979 | Ijichi et al. ............ | 524/145 |
| 4,208,310 | 6/1980 | Lundberg et al. ..... | 524/451 |

FOREIGN PATENT DOCUMENTS 1422124 1/1976 United Kingdom ................. 524/66

OTHER PUBLICATIONS

Derwent Abst. 13124 Y/08 (DT2536397), Feb. 1977.
Derwent Abst. 76473 Y/43 (J50126038), Oct. 1975.
Derwent Abst. 55633 A/31 (J53071139), Jun. 1978.
Chem. Abs. 94–104176 (14), Lundberg et al., 1980.

*Primary Examiner*—Melvyn I. Marquis
*Assistant Examiner*—Herbert J. Lilling
*Attorney, Agent, or Firm*—Richard E. Nanfeldt

[57] ABSTRACT

This invention relates to hot melt adhesive compositions which include an elastomeric co- or terpolymer, about 5 to about 100 parts by weight of a neutralized sulfonated co- or terpolymer per 100 parts by weight of the highly unsaturated hydrocarbon rubber, wherein the neutralized sulfonated elastomeric polymer has about 0.2 to about 5 weight percent of chemically combined sulfur and about 25 to about 200 parts by weight of a hydrocarbon resin of a petroleum or coal tar distillate, aliphatic dienes and mono and diolefins, cyclic olefins of 5 to 6 carbon atoms and hydrogenated poly cyclics per 100 parts by weight of the neutralized sulfonated co- or terpolymer rubber.

12 Claims, No Drawings

ADHESIVE COMPOSITIONS

CROSS REFERENCE TO RELATED APPLICATIONS

This is a continuation-in-part application of U.S. Ser. No. 196,213, filed Oct. 14, 1980 and now abandoned which is based on P.M. CRL-190-78.

BACKGROUND OF THE INVENTION

1. Field of the Invention

This invention relates to adhesive compositions which include an elastomeric sulfonate co- or terpolymer, wherein the neutralized sulfonated co- or terpolymer has about 0.2 to about 3 weight percent of chemically combined sulfur obtained by copolymerization, and about 25 to 200 parts by weight of a hydrocarbon resin of a petroleum or coal tar distillate, having about 5 to about 6 carbon atoms, the hydrocarbon resin being composed of aliphatic dienes and monoolefins per 100 parts by weight of the neutralized sulfonated co- or terpolymer.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Besides this energy requirement for the formation of the bond, there is another complication with the use of water based adhesive. For a uniform coating a good uniform wetting of the substrate surface is desired, which is not easily achieved.

With the solvent-based adhesives usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

Recently the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they should have good physical properties, e.g., tensile strength, etc., at ambient conditions, and they can flow easily at fabrication temperatures and they must have sufficiently good compatability that they do not phase separate on storage or during subsequent use. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. In the past it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

2. Prior Art

Several U.S. Patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated Butyl cement which is solvent based and is employed to laminate various substrates. It is important to note that the instant invention differs dramatically from that patent as follows:

(a) The instant invention is directed at sulfonated co- or terpolymers formed by a copolymerization process whereas most of the prior art deals with sulfonated Butyl rubber (e.g., U.S. Pat. No. 3,867,247) which was formed by sulfonation of the Butyl rubber.

(b) The instant invention may optionally include a preferential plasticizer capable of associating with the metal sulfonate groups and thereby reducing the melt viscosity of the resulting blends to make the systems more processable.

(c) The polymers used in the instant invention are chemically different from those of the patents above giving rise to different properties and compatabilities.

SUMMARY OF THE INVENTION

This invention relates to adhesive compositions which include a sulfonate co- or terpolymer, wherein the neutralized sulfonated co- or terpolymer has about 5 to about 100 meq. of neutralized sulfonate groups per 100 grams of the neutralized sulfonated elastomeric polymer and about 25 to about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the neutralized sulfonated co- or terpolymer and optionally, about 1 to about 50 parts of a preferential plasticizer per 100 parts of the neutralized sulfonated co- or terpolymer can can be added to the composition.

GENERAL DESCRIPTION

The present invention relates to unique and novel adhesive compositions which comprise neutralized sulfonated co- or terpolymers, and a hydrocarbon resin, wherein the compositions can be optionally added an ionic preferential plasticizer oil, and/or a filler thereby modifying the rheological and physical properties of the hot melt adhesive compositions.

A. Sulfonated Polymer and Process for Forming

The neutralized sulfonated solid co- or terpolymers of this present instant invention are formed by a copolymerization process.

These solid sulfonated co- or terpolymer of the instant invention comprise at least 80% by weight of at least one conjugated diene having from 4 to 12 carbon atoms and a minor proportion of a metal or amine neutralized sulfonate monomer characterized by the formula:

$$CH_2=CH$$
$$|$$
$$XSO_3Y$$

where X is $(CH_2)_n$, or aromatic wherein $n=0, 1, 2, 3$, and Y is a cation selected from Groups IA, IIA, IB and IIB of the periodic table or an amine of the formula:

and where $R_1$ and $R_2$ can be aliphatic groups of $C_1$ to $C_{12}$ or hydrogen, the co- or terpolymer being water insoluble having at least 0.2 weight percent sulfur to less than about 3 weight percent sulfur chemically combined.

The instant invention relates to the formation of sulfonate containing copolymers which are preferably formed by a free radical copolymerization process. The monomers used in the free radical emulsion copolymerization process are conjugated dienes which are copolymerized with sulfonate containing monomers.

In general, the conjugated diene and sulfonate containing monomer are dispersed in a water phase in the presence of an initiator which is preferably soluble in the conjugated diene phase and a suitable surfactant, wherein the temperature is sufficient to initiate polymerization. The resultant latex is coagulated usually by the addition of an aqueous salt solution and the recovered co- or terpolymer is washed with water and subsequently dried under vacuum at room temperature.

The co- or terpolymers formed from the free radical emulsion copolymerization process of the instant invention can be generally described as having an Mn of about 5,000 to about 200,000 more preferably about 10,000 to about 100,000. The co- or terpolymers of the instant invention contain about 0.2 to about 3 weight % of chemically combined sulfur, more preferably about 0.5 to about 3 and most preferably about 0.6 to about 3, most preferably about 0.7 to about 2.0 weight % sulfur. Typical, but non-limiting examples of the copolymers which can be formed by the instant free radical emulsion copolymerization process are: butadiene/sodium styrene sulfonate copolymer, isoprene/sodium sulfonate styrene copolymer, butadiene/sodium vinyl sulfonate, isoprene/sodium vinyl sulfonate copolymer. Obviously, an infinite number of copolymers and even terpolymers can be formed by the instant free radical copolymerization process. Typically, the copolymerization of any conjugated diene as so defined herein can be readily copolymerized with any sulfonate containing monomer as is defined herein. Terpolymers with styrene, acrylonitrile, vinyl chloride as the termonomers with the aforementioned dienes are also contemplated provided that no more than 10 weight percent of the termonomer is combined therein.

CONJUGATED DIENES

The conjugated dienes of the instant invention are generally defined as aromatic such as styrene, acyclic conjugated dienes containing from about 4 to about 10 carbon atoms more preferably about 4 to about 6 carbon atoms. Typical, but non-limiting examples of acyclic conjugated dienes are piperidene, 1,3-butadiene, isoprene (2-methyl-1,3-butadiene), 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenyl butadiene, chloroprene and piperidene. Typical, but non-limiting examples of cyclic conjugated dienes are cyclopentadiene and methyl cyclopentadiene. The preferred conjugated dienes of the instant invention are selected from the group consisting of 1,3-butadiene, isoprene and chloroprene. In the formation of the sulfonate containing copolymer, one copolymerizes one of the aforementioned conjugated dienes with the sulfonate containing monomer. Sulfonate containing terpolymers can be readily formed by copolymerizing the sulfonate containing monomer with a mixture of two of the above identified conjugated dienes. Other suitable monomers which can be copolymerized with a sulfonate containing monomer are selected from the group consisting of styrene, butadiene styrene, ethylene, vinyl chloride, vinyl acetate and methylacrylate and mixtures thereof.

SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

$$CH_2=CH$$
$$|$$
$$XSO_3Y$$

where X is $(CH_2)_n$, where $n=0, 1, 2, 3, 4$ or aromatic, and Y is a cation selected from Groups IA, IIA, IB and IIB of the periodic table of an amine of the formula:

where $R_1$ and $R_2$ can be aliphatic groups of $C_1$ to $C_{12}$ or hydrogen. Particularly suitable metal cations are sodium, potassium, and zinc, and an especially preferred metal cation is sodium. Typical but non-limiting examples of suitable sulfonate containing monomers are:

(1) $CH_2=CHSO_3^-Na^+$ sodium vinyl sulfonate
(2) $CH_2=CHCH_2SO_3^-Na^+$ sodium allyl sulfonate (3) $CH_2=CH-\langle\text{aromatic ring}\rangle-SO_3^-Na^+$ sodium styrene sulfonate An especially preferred sulfonate containing monomer is sodium sulfonate styrene. The molar ratio of sulfonate containing monomer to conjugated diene is about 1/200 to about 1/5, more preferably about 1/150 to about 1/6, and most preferably about 1/100 to about 1/9.

The redox emulsion polymerization recipe used in this invention is effective in initiating the copolymerization of water-insoluble and water-soluble comonomers in an emulsion system. Because the peroxide initiator is dissolved in the monomer and the redox activator is dissolved in the water, the surface of the micelle/growing polymer particle is believed to be the locus of formation of initiator molecules as well as the polymerization locus. Water phase homopolymerization of the polar, water-soluble monomer is effectively depressed because of low primary radical concentration in the aqueous phase. However other initiators are also contemplated for preparation of these systems.

A variety of free radical catalysts can be employed in this invention. This includes a preferential class of free radical initiators such as benzoyl peroxide, cumene peroxide, t-butyl hydroperoxide and similar systems which will be preferentially soluble in the monomer phase as opposed to the aqueous phase. There are a large number of such peroxides used in the art and those having the appropriate solubility behavior and suitable decomposition temperatures in the presence of the reducing agents are satisfactory for the purposes of this invention. Water soluble initiators may also be employed, although the characteristics of the products may be different.

The surfactants employed for this invention are varied and well known in the art. The typical emulsifiers or surfactants can be employed, however, some are more effective than others in generating latexes of better stability. A preferred emulsifier is sodium lauryl sulfate.

The buffering agents employed in the instant polymerization process are selected from the group consisting of sodium carbonate, ammonia, sodium acetate, trisodium phosphate etc. These buffering agents are employed at a concentration of about 0.1 to about 5 grams/100 grams water employed in the emulsion system.

Chain transfer agents can be readily employed in the instant polymerization process for controlling the molecular weight of the resultant copolymer. The concentration of chain transfer agent is about 0.05 to about 0.5 grams/100 grams of the combined weight of the sulfonate containing monomer and the conjugated diene.

The free radical emulsion copolymerization of the water soluble sulfonate containing polymer and the conjugated diene yields a stable latex, wherein the resultant water insoluble co- or terpolymer is not covalently crosslinked and possesses substantial ionic crosslinking, and has about 0.2 to about 3 weight percent of chemically combined sulfur, more preferably about 0.5 to about 3. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble co- or terpolymer is recovered by filtration and subsequently washed with water and dried under vacuum conditions at about warm temperature. Alternatively, the polymer can be coagulated by precipitation with alcohol such as methanol.

B. Plasticizers

The metal sulfonate containing polymers at higher sulfonate levels can possess extremely high melt viscosities and are thereby difficult to process. The optional addition of ionic group (preferential) plasticizers markedly reduces melt viscosity and frequency enhances physical properties. To the neutralized sulfonated co- or terpolymer is added, in either solution or to the crumb of the sulfonated co- or terpolymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic or stearic acids and mixtures thereof; e.g., zinc stearate magnesium stearate, or zinc laurate.

The preferential plasticizer is incorporated into the neutralized sulfonated co- or terpolymer at about 3 to about 75 parts by weight based on 100 parts by weight of the neutralized sulfonated co- or terpolymer, more preferably at about 7 to about 50, and most preferably at about 10 to about 30. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated co- or terpolymer with preferential plasticizer is isolated from the solution by conventional steam stripping and filtration.

C. Commercial Tackifier Resins

To the hot melt adhesive composition is added a commercial tackifying resin having a softening point of about 0° to about 160° C., more preferably about 50° to about 140° C. and most preferably about 70° to 120° C. A variety of commercial tackifier resins are available. Some of these resins contain α and/or β pirene base polyterpene resins as the main ingredient while others are derived from the polymerization of petroleum or coal distillates which consist of aliphatic dienes, mono and di-olefins and cyclic olefins having about 5 to about 6 carbon atoms. The latter type of tackifiers have primarily piperlene and/or isoprene structure. A general but excellent description of tackifying resins derived from petroleum derivatives can be found in, for example, Encyclopedia of Polymer Science and Technology, Vol. 9, Pages 853 to 860, chapter by John Findlay, published by John Wiley & Sons, NY (1968).

Typical but non-limiting tradenames of these commercial tackifiers are Wingtak of Goodyear, Escorex of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquid or light-colored solids at room temperature. Most often their initial color (Gardner) is 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads the number average molecular weight Mn can be from about 300 to about 5000 and more preferably about 500 to about 2000 and most preferably about 700 to 1600.

As well-known to this familiar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 700 parts by weight per 100 parts by weight of the neutralized sulfonated co- or terpolymer, more preferably about 50 to about 500, and most preferably about 75 to about 300.

D. Method of Forming Blend Adhesive Composition

The blend compositions of the elastomeric co- or terpolymer, neutralized sulfonated elastomeric polymer with or without preferential plasticizer and the hydrocarbon tackifier resin can be formed by techniques well known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

E. Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at less than about 800 parts by weight per 100 parts by weight of the neutralized sulfonated co- or terpolymer, more preferably at at about 50 to about 500; and most preferably at about 75 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
| --- | --- | --- | --- | --- | --- |
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

F. Oil Extended Adhesive Compositions

It is observed that the blend composition of the instant invention can also include oils to further improve low temperature properties and tack characteristics of the resulting adhesive levels of oil of less than about 100 parts by weight per 100 parts of the neutralized sulfonated polymer can be incorporated, more preferably about 1 to about 90 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffin petroleum oils. Typical oils are illustrated in Table II.

G. In addition other polymers can be incorporated into the compositions of this invention such as polyisobutylene, ethylene propylene copolymer or ethylene propylene diene terpolymer, ethylene vinyl acetate copolymers, natural rubber, polyisoprene, cis 1,2 polybutadiene, 1,4 polybutadiene and similar polymers which are largely elastomeric and are reasonably compatible with the sulfonate copolymers or terpolymers of this invention as long as the added polymer does not constitute more than 90 parts by weight per 100 parts of sulfonate containing co- or terpolymer which is the primary ingredient of this invention.

TABLE II

| Type Oil | Oil Code # | Viscosity ssu | $M_n$ | % Polars | % Aromatic | % Saturates |
| --- | --- | --- | --- | --- | --- | --- |
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphtehnic | Flexon 765 | 505 | — | 0.9 | 20.8 | 78.3 |

H. Method of Fabrication of Adhesive Compositions

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which could be paper, cloth, aluminum foil or glass fabric. The temperature and the through put of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terephthalic acid, vinyls such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum and alloys thereof can also be employed. In general, the backings employed are those which have heretofore been conventionally employed in preparing pressure sensitive labels, tapes, sheetings and the like and the selection of any particular substrate material is not a specific novel feature of the present invention.

DETAILED DESCRIPTION OF THE INVENTION

The advantages of the hot melt adhesive compositions of the present invention can be more readily appreciated by reference to the following examples and tables. Unless otherwise specified, all measurements are in parts per hundred by weight.

The peel strength values were obtained by a method similar to ASTM D-429 adhesion test. In brief, the samples were sandwiched between mylar sheets and pressed to a thickness of about 25 mils using a hot press. Rectangular strips of ½" width and 3" long were cut and 90° peel tests were performed on an Instron at room temperature. The resin free sections of the mylar film were clamped into air jaws to avoid any slippage during pulling. The samples were pulled at 5"/min. crosshead speed. The force and elongation of the samples were recorded on a strip recorder. The force necessary to separate the mylar sheets was taken as the peel strength of the blend. The initial peak values are reported in the fifth column on Table IV.

The following preparations describe the synthesis of an isoprene/sodium styrene sulfonate copolymer and an butadiene/sodium styrene sulfonate copolymer.

EXAMPLE 1

A copolymer of sodium styrene sulfonate and butadiene. The following were charged into a polymerization vessel:

| water (distilled) | 200 parts |
| Tween 80 | 9.2 parts |
| Sodium Pyrophosphate | 1.2 parts |
| Triethylenetetramine (25% solution) | 8.0 parts |
| Piisopropylbenzene Hydroperoxide (25% solution) | 8.0 parts |
| Sodium Styrene Sulfonate | 8.0 parts |
| Butadiene | 77.3 parts |
| 1-Dodecanethiol (14% solution) | 4.0 parts |

The polymerization was conducted at a temperature of 20° C. for 20 hours. At that time 12 ml of methanolic solution containing 0.8% hydroquinone and 1.2% ditertiary butyl phenol was added to the latex. The resulting product was precipitated in methanol.

The copolymer was gel-free and contained 0.46 percent chemically combined sulfur, and had a reduced viscosity measured in a mixed solvent of 95% toluene at 5% methanol of 1.7.

EXAMPLE 2

A copolymer of sodium styrene sulfonate and butadiene was prepared as described in Example 1. The product contained 0.49% chemically combined sulfur and was fully soluble in a mixed solvent of 95% toluene at 5% methanol.

EXAMPLE 3

A copolymer of sodium styrene sulfonate and isoprene. The following were charged into a polymerization vessel:

| Water (distilled) | 1958 parts |
| Sodium Lauryl Sulfate (30% solution) | 117.3 parts |
| Sodium Pyrophosphate ($Na_4P_2O_7.10H_2O$) | 8.6 parts |
| Ammonium Ferrous Sulfate (($NH_4$)$_2$Fe($SO_4$)$_2$.6$H_2O$) | 8.6 parts |
| Sodium Styrene Sulfonate | 96 parts |
| 1-Dodecanethiol | 4.5 parts |
| Benzoylperoxide (70% in water) | 5.0 parts |
| Isoprene | 912 parts |

The polymerization was conducted at a temperature of 22° to 25° C. for about 24 hours. At that time a solution of methanol (80 parts containing about 9.4 parts of ditertiary butyl phenol and 0.6 parts of hydroquinone) was added to the latex. The resulting product was precipitated into methanol saturated with sodium chloride and the resulting precipitate filtered two times with water.

The product was a tacky, elastic solid, containing 1.3% chemically combined sulfur, and had a reduced viscosity of 0.7 dl/g in a mixed solvent of 95% xylene and 5% methanol.

EXAMPLE 4

A copolymer of sodium styrene sulfonate and isoprene was prepared as described in Example 3 with the exception that the reaction was stopped after 10 hours. The copolymer contained 0.38% chemically combined sulfur and was gel-free as demonstrated by its solubility in a mixed solvent of 95% toluene and 5% methanol. A thin film compression molded at 180° C. had the following tensile properties: modulus at 100% elongation=34 psi, ultimate strength=79 psi, and ultimate elongation=620%.

EXAMPLE 5

The four products of the previous examples were melt blended with commercial petroleum tackifier resins commonly employed in the adhesive industry. Two such resins are known by their tradenames as Escorez 2101 (marketed by Exxon Chemical Corporation) and Wingtak Plus (marketed by Goodyear). These solid resins soften at temperatures of 60° to 100° C., are low molecular weight polymers of about 1000 number average obtained by the copolymerization of aliphatic dienes, monoolefins and cyclicolefins. These materials were blended with the sulfonate copolymers on a hot two-roll mill incorporating some Irganox 2246 as a protective antioxidant. The resulting blends were very tacky at elevated temperatures, and remained so at ambient temperatures. To test the peel strength of these blends they were compression molded between sheets or oriental polyester film (Mylar) with the final thickness of the adhesive being about 25 mil. In all cases the blends appeared clear indicating excellent homogencity and compatability. The blends and their respective properties are shown in Tables III and IV.

TABLE III

Compositions of Blends of Sulfonated Copolymers With Petroleum Resins

| Example No. and Description | 3-1 | 3-2 | 3-3 | 3-4 | 3-5 |
|---|---|---|---|---|---|
| Ex. 1-Sulfonated Styrene-Butadiene | 50 | — | — | — | — |
| Ex. 2-Sulfonated Styrene-Butadiene Copolymer | — | 50 | — | 50 | — |
| Ex. 3-Sulfonated Styrene-Isoprene Copolymer | — | — | 50 | — | — |
| Ex. 4-Sulfonated Styrene-Isoprene Copolymer | — | — | — | — | 50 |
| Wingtak Plus | 50 | 50 | 50 | — | 50 |
| Escorez 2101 | — | — | — | 50 | — |
| Irganox 2246 (Antioxidant) | 2 | 2 | 2 | 2 | 2 |

TABLE IV

Properties of The Blends of Sulfonated Copolymers With Petroleum Resins

| Blend # | Green Strength | Tackiness | Clarity* | Peel Strength Pound - Force |
|---|---|---|---|---|
| 3-1 | Medium | Slightly Tacky | Clear | 0.5 |
| 3-2 | High | Tacky | Clear | 1.8 |
| 3-3 | Medium | Very Tacky | Clear | 1.6 |
| 3-4 | High | Tacky | Clear | 1.6 |
| 3-5 | Medium | Tacky | Clear | 4.4 |

*Appearance of compression molded pads of about 25 mil thickness.

It is evident from the data in Table IV that these compositions even in unoptimized form possess a high level of tack clarity, and peel strength. Such systems offer a balance of adhesive properties which appear quite different from others described in the prior art.

It is also contemplated that the compositions described in the instant invention can be deposited by solvent casting from suitable solvent systems. Due to the strong ionic associations prevalent with these sulfonated ionomers, suitable solvents must be selected with care. Often solvent mixtures comprised of a hydrocarbon and a low level of a polar cosolvent can be employed such as 5 to 10% by volume of a volatile alcohol.

What is claimed is:

1. An adhesive composition which comprises:
   (a) a neutralized sulfonate containing polymer having about 0.2 to 3 weight percent of chemically combined sulfur wherein said neutralized sulfonated co- or terpolymer comprises at least 80% by weight of at least one conjugated diene having from 4 to 12 carbon atoms and a minor proportion of a metal or amine neutralized sulfonate monomer characterized by the formula:

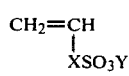

where X is $(CH_2)_n$, or aromatic, wherein $n = 0, 1, 2, 3, 4$, and Y is a cation selected from Groups IA, IIA, IB and IIB of the periodic table or an amine of the formula:

where $R_1$ and $R_2$ can be aliphatic groups of $C_1$ to $C_{12}$ or hydrogen, said co- or terpolymer being water insoluble; and
   (b) about 25 to about 200 parts by weight of a hydrocarbon tackifying resin based on a petroleum or coal tar distillate per 100 parts by weight of said sulfonate containing polymer.

2. An adhesive composition according to claim 1, wherein said adhesive composition is a hot melt adhesive composition.

3. A composition according to claim 1, wherein said sulfonate containing monomer is a metal neutralized sulfonated styrene.

4. A composition according to claim 1 or 3, wherein said conjugated diene is selected from the group consisting of 1,3-butadiene, isoprene and chloroprene and mixtures thereof.

5. A composition according to claim 3, wherein said conjugated diene is isoprene.

6. A composition according to claim 3, wherein said conjugated diene is 1,3-butadiene.

7. A hot melt adhesive according to claim 1 or 2, further including about 3 to about 75 parts by weight of an ionic preferential plasticizer per 100 parts by weight of said neutralized sulfonated co- or terpolymer, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thioureas and mixtures thereof.

8. A hot melt adhesive according to claim 7, wherein said preferential plasticizer is said metallic salt of said carboxylic acid.

9. A hot melt adhesive composition according to claim 8, wherein said metallic salt of said carboxylic acid is zinc stearate.

10. A hot melt adhesive composition according to claims 1 or 2 further including about 5 to about 800 parts by weight of a filter per 100 parts by weight of said sulfonate containing polymer, said filler being selected from the group consisting of calcium carbonates, silicas, carbon blacks, clays and talcs and mixtures thereof and/or less than about 100 parts by weight of an oil having less than 2 wt. % polars per 100 parts by weight of said sulfonate containing polymer.

11. A hot melt adhesive composition according to claims 1 or 2 wherein said hydrocarbon resin has about 5 to about 6 carbon atoms and consists of aliphatic dienes, mono and di-olefins and cyclic olefins.

12. An adhesive composition according to claim 1 further including a solvent.

* * * * *